United States Patent
Huckins

(10) Patent No.: US 7,147,833 B2
(45) Date of Patent: Dec. 12, 2006

(54) METHOD FOR PRODUCING HYDROGEN PEROXIDE FROM HYDROGEN AND OXYGEN

(76) Inventor: Harold A. Huckins, 4 Bertram Pl., Hilton Head Island, SC (US) 29928

( * ) Notice: Subject to any disclaimer, the term of this patent is extended or adjusted under 35 U.S.C. 154(b) by 477 days.

(21) Appl. No.: 10/106,011

(22) Filed: Mar. 25, 2002

(65) Prior Publication Data

US 2003/0180212 A1 Sep. 25, 2003

(51) Int. Cl.
*C01B 15/029* (2006.01)
(52) U.S. Cl. ..................................... 423/584
(58) Field of Classification Search ................ 423/584
See application file for complete search history.

(56) References Cited

U.S. PATENT DOCUMENTS

| | | | |
|---|---|---|---|
| 3,761,580 A | 9/1973 | Schreyer et al. ............ 423/588 |
| 4,007,256 A | 2/1977 | Kim et al. | |
| 4,309,390 A | 1/1982 | Harper et al. | |
| 4,336,238 A | 6/1982 | Dalton, Jr. et al. | |
| 4,336,239 A * | 6/1982 | Dalton et al. ................ 423/584 |
| 4,336,240 A * | 6/1982 | Moseley et al. ............. 423/584 |
| 4,347,231 A | 8/1982 | Michaelson ................ 423/584 |
| 4,347,232 A | 8/1982 | Michaelson ................ 423/584 |
| 4,547,354 A | 10/1985 | Pinault ....................... 423/587 |
| 5,071,634 A | 12/1991 | Maunula ..................... 423/588 |
| 5,104,635 A * | 4/1992 | Kanada et al. ............. 423/584 |
| 5,194,242 A * | 3/1993 | Paoli ........................... 423/584 |
| 5,196,179 A | 3/1993 | Turunen et al. ............. 423/584 |
| 5,399,334 A * | 3/1995 | Kawakami et al. ........ 423/584 |
| 5,637,286 A | 6/1997 | Turunen ...................... 423/588 |
| 5,641,467 A | 6/1997 | Huckins | |
| 5,783,164 A | 7/1998 | Bianchi et al. ............. 423/584 |
| 5,965,101 A | 10/1999 | Goto et al. | |
| 5,976,486 A * | 11/1999 | Thompson et al. ......... 423/584 |
| 6,042,804 A | 3/2000 | Huckins | |
| 6,224,845 B1 | 5/2001 | Pennetreau et al. ........ 423/584 |
| 6,342,196 B1 | 1/2002 | Beckman et al. ........... 423/588 |
| 6,375,920 B1 * | 4/2002 | Fischer et al. .............. 423/584 |
| 6,447,743 B1 * | 9/2002 | Devic et al. ................ 423/584 |
| 6,576,214 B1 * | 6/2003 | Zhou et al. ................. 423/584 |
| 6,649,140 B1 * | 11/2003 | Paparatto et al. .......... 423/584 |

FOREIGN PATENT DOCUMENTS

| | | |
|---|---|---|
| JP | 09235108 A | 9/1997 |
| WO | WO 00/66489 | 11/2000 |

OTHER PUBLICATIONS

Dan Hancu, et al., *Production of Hydrogen Peroxide in Liquid Co 3 Oxidation of CO-Philic Anthrahydroquinones*, Ind. Eng. Chem. Res. 2000, 39, pp. 2843-2848, no month.

Dan Hâncu and Eric J. Beckman, "Generation of hydrogen peroxide directly from H2 and O2 using Co2 as the solvent," 3 Green Chemistry 80-86 (2001), no month.

* cited by examiner

*Primary Examiner*—Wayne A. Langel
(74) *Attorney, Agent, or Firm*—Edell, Shapiro &Finnan, LLC

(57) ABSTRACT

The invention relates to a method and apparatus for safely producing hydrogen peroxide by injecting dispersed minute bubbles of hydrogen and oxygen into a rapidly flowing liquid medium. The liquid medium can contain either a water-soluble organic compound, a water-insoluble organic compound, a combination of a water-insoluble organic compound with water, liquid carbon dioxide or supercritical carbon dioxide. The minute bubbles are surrounded by the liquid medium of sufficient volume for quench cooling any explosive reaction between the hydrogen and oxygen. The present invention also relates to reactors with internal catalyst structures and reactors that have a circular path, both of which may be used to produced hydrogen peroxide.

41 Claims, 5 Drawing Sheets

END VIEW

SIDE VIEW

END VIEW

SIDE VIEW

METHOD FOR PRODUCING HYDROGEN PEROXIDE FROM HYDROGEN AND OXYGEN

BACKGROUND OF THE INVENTION

1. Field of the Invention

The present invention relates to a method and apparatus for producing hydrogen peroxide by injecting minute bubbles of hydrogen and oxygen into a liquid stream of a carbon containing liquid phase reaction medium and a supported metal catalyst in which the liquid stream flows at high velocity.

2. Description of the Related Art

It is known that a mixture of gaseous oxygen and gaseous hydrogen forms an explosive mixture. Virtually all currently produced hydrogen peroxide is produced by indirectly combining hydrogen and oxygen. Thus, the primary conventional industrial method for production of hydrogen peroxide uses a chemical agent such as an alkylanthraquinone— ethyl or tertiary butyl anthraquinone. The anthraquinone is first hydrogenated to a hydroquinone and then oxidized with air to produce hydrogen peroxide and the original alkylanthraquinone. The anthraquinone specie is recycled back to the process. To solubilize the anthraquinone and hydroquinone, large volumes of a corresponding carbinol, methylnaphthalene and other organics are added to form a working solution. This method has the shortcoming that there is a considerable loss of the anthraquinone and the organic solvents from their hydrogenation, oxidation and thermal degradation plus the high cost of its processing, handling and storage.

The presence of these formed undesired organic byproducts with hydrogen, oxygen and hydrogen peroxide presents further safety hazards and further interactions between the solvents, feed gases and intermediates that can be formed. All such organic byproducts must be removed from the desired hydrogen peroxide product. These byproducts present waste treating problems.

Various methods have been attempted to directly combine oxygen and hydrogen. The direct combination of hydrogen and oxygen to form hydrogen peroxide has the advantage of an inherent simplification of chemistry and processing. The direct process, however, does require careful control of the gaseous mixture of hydrogen and oxygen, so that one is either always outside the flammable or explosive range of hydrogen and oxygen or operating conditions are selected where an explosive mixture can be safely handled.

Most direct hydrogen peroxide processes operate in an aqueous environment. These direct processes suffer two substantial economic handicaps. They operate with a continuous gaseous phase, which requires hydrogen to be below its lower flammable/explosive limit or 4–5%. This gives a low productivity-uneconomic reaction system. Secondly, such processes suffer a further economic handicap from the low solubility of hydrogen and oxygen in an aqueous (water) solution. The solubility of these gases can be several fold higher in organic solvents, leading to a smaller, less expensive reaction system. Under such conditions, there is no means to extinguish or quench the reaction with the equipment provided.

The processes for the direct production of hydrogen peroxide cannot operate within the flammable range of hydrogen with oxygen because of the presence of a continuous gas phase above the liquid level or the potential presence of large bubbles in the reaction system.

U.S. Pat. Nos. 5,641,467 and 6,042,804, describe producing hydrogen peroxide by injecting dispersed minute bubbles of hydrogen and oxygen into an acidic liquid containing solely water and a Group VIII metal catalyst. The regime of dispersed minute individual bubbles permits the quenching of any reaction that may occur within the bubble by the surrounding liquid thus permitting operating the reactor within the flammable range of hydrogen with oxygen plus diluents.

U.S. Pat. No. 5,965,101 describes the use of 90%–100% methanol reaction media in a conventional suspension or fixed bed reactor. Such a reactor gives a continuous gas phase, which limits the hydrogen content to under 5%. U.S. Pat. No. 5,399,334 uses a combination of halogen bearing organic and water in conventional reactor design.

U.S. Pat. Nos. 4,309,390; 4,336,240; 4,336,239; 4,336,238, all assigned to Air Products and Chemical, employ organic solvents with and without some water in agitated tank or other conventional reactors. U.S. Pat. Nos. 4,347,232 and 4,347,231 describe the use of water with halogenated organic solvent that has limited solubility for water and hydrogen peroxide. These patents teach the use of a conventional agitated tank reactor. U.S. Pat. No. 4,007,256 concerns the use of an organic-nitrogen compound with water in a fixed bed reactor.

OBJECTS OF THE INVENTION

It is a primary object of the invention to produce hydrogen peroxide commercially and economically in a safe manner as a solution of hydrogen peroxide in a water-soluble organic medium.

It is another object of the invention to provide a process, which operates in the flammable range of hydrogen/oxygen to benefit from increased reaction rate, which is both safe and efficient while producing hydrogen peroxide in a water-insoluble organic medium and to subsequently extract the hydrogen peroxide into an aqueous medium.

It is yet another object of the invention to first form minute bubbles of hydrogen and oxygen each surrounded by sufficient liquid to fully quench any reaction that may occur, while benefiting from their increased solubility in an organic solvent media.

It is still a further object of the invention to utilize a dispersed bubbly flow regime of hydrogen-oxygen bubbles to produce hydrogen peroxide water solution, where the solvent is supercritical or liquid carbon dioxide.

It is still a further object of the invention to utilize a dispersed bubbly flow regime to produce hydrogen peroxide in either an aqueous, organic-water, water-soluble or water-insoluble organic solvent or liquid or supercritical carbon dioxide in an elongated cylinder reactor with continuous circular reactor free of any sudden changes in direction by not utilizing bends, elbows or tees.

It is still a further object of the invention to employ an internal catalyst structure, while still maintaining a dispersed bubbly flow regime, thus avoiding the need to filter out the suspended insoluble catalyst and remove the acid stabilizer from the desired hydrogen peroxide product.

It is a further embodiment of this invention to utilize a duplex stainless steel that has a PREN number over 34 and thereby obtain thinner wall reactors, increased corrosion resistance, greater hardness to minimize damage from erosion and lower cost than with any compatible high nickel alloys or reactive metals such as titanium, zirconium, niobium or tantalum.

SUMMARY OF THE INVENTION

The invention comprises a method and apparatus for producing hydrogen peroxide in which hydrogen and oxygen are separately injected into a liquid filled reactor to form a plurality of discrete small individual bubbles in a continuous rapid-flowing, liquid stream of a reaction medium. Each bubble is surrounded by a continuous liquid phase of the reaction medium, such that if the hydrogen and oxygen gas in the bubble fully reacted, there is sufficient liquid available around each bubble to quench/cool down the reaction to prevent bubble coalescence and to prevent an explosion from propagating throughout the reactor. By controlling the ratio of the total liquid of reaction medium to the total gaseous volume of flow of hydrogen, oxygen, and possible diluent both independently, and, in the aggregate, sufficient liquid volume is provided for each bubble to quench any runaway reaction that might take place. It is also important to maintain the flow velocity of reaction medium at a velocity to obtain a dispersed bubbly flow regime, for example four feet per second.

Examples of suitable reaction media include water-soluble organic solvents, water-insoluble organic solvents, liquid carbon dioxide, and supercritical carbon dioxide, all possibly in combination with water. The presence of water permits the hydrogen peroxide to preferably enter the water phase for the latter three solvents above.

It has been found that the reaction can be safely and efficiently operated at higher levels of space-time yield, if the reaction pressure is above 300 psi. Preferably, the pressure is above 1000 psi. Most advantageously, it is from 1200 to 4000 psi.

For example, an elongated cylinder or pipeline reactor is used having a plurality of passes within the reactor. The pipeline reactor can be formed of a plurality of tubes arranged vertically or horizontally and connected with curved tubes (U-bends). The liquid stream can be formed from various reaction media containing, for example, a Group VIII metal catalyst and/or a dilute acid.

The Group VIII metal catalyst can be palladium, platinum, rhodium, iridium or a mixture of two-three on an inert support such as alumina, silica or oxide, carbonate or sulfate compound of an alkaline earth metals—(group IIA). The liquid stream fills the reactor. Recycled gas containing hydrogen, oxygen and nitrogen is first injected into the flowing liquid stream. Oxygen gas is then injected to form finely dispersed bubbles. After the bulk of the oxygen is dissolved, hydrogen gas is injected so that it too will mostly go into solution, where the hydrogen and oxygen will react to form hydrogen peroxide in the presence of the catalyst. As this direct reaction occurs, further injections of first oxygen and then hydrogen can be used to raise the concentration of hydrogen peroxide produced to a predetermined level. The number of injections of oxygen and hydrogen can be varied for producing the desired concentration of the hydrogen peroxide.

It has also been found that the safety of the reaction system can be ensured, if the reaction zone is comprised of vertically oriented pipes. Experience has shown that the bubbles rise to the top of horizontally oriented pipes. These bubbles do not coalesce but they get very close together, often touching each other. If a reaction should occur within these bubbles, there is inadequate liquid around each bubble to permit cooling the bubbles. This could lead to an uncontrolled temperature rise with possible explosive results. Gas bubbles also rise in vertical pipes, but the selected liquid velocity is sufficiently high so that the bubbles move continuously forward with flowing liquid medium in a uniformly dispersed manner.

It has also been found that it is advantageous to continuously cool the entire reaction zone throughout the duration of the reaction.

The present invention has the advantage of avoiding a continuous gas phase or large bubbles containing hydrogen and oxygen or the existence of bubbles with inadequate liquid around each bubble at any point in the reactor. This permits full utilization of the entire volume of the reactor. The production of hydrogen peroxide occurs in the liquid phase between the dissolved hydrogen and oxygen gases in the presence of a catalyst. This method prevents an explosive reaction from taking place, thereby allowing the concentration of unreacted hydrogen and oxygen gas to be within the explosive range.

Utilizing the techniques discussed above, with a water-soluble organic solvent for the reaction media, the solubility of hydrogen and oxygen will be several fold greater with an organic solvent over that of an aqueous solution. This will greatly reduce the size of the reaction system, which leads to lower capital and operating costs. There are applications for hydrogen peroxide-organic solvent as the final product, such as the production of petrochemicals where hydrogen peroxide as the oxidant. These products include: propylene oxide, phenol, caprolactam, dihydroxylbenzenes, etc.

Upon the completion of the direct combination to produce hydrogen peroxide, the reactor effluent can pass through a solvent extraction column, where the hydrogen peroxide is extracted into the aqueous phase to give a product of hydrogen peroxide-water product and an organic solvent phase that is recycled to the reactor. The addition of water into the reactor simplifies the transfer of hydrogen peroxide from organic to water phase through a simple separator over that of a solvent extraction column.

Another embodiment of the invention is to use liquid or supercritical carbon dioxide as the reaction media. Hydrogen and oxygen are completely miscible with supercritical carbon dioxide, leading to much smaller reaction systems, where heat removal is the technical limitation. Water can be added to the reactor in such a quantity to provide a final product that is at the desired strength of peroxide in water after the pressure of system is lowered. Because of the higher volatility of carbon dioxide over water, the final product will be largely free of carbon dioxide. The use of either liquid or supercritical carbon dioxide leads to a concentrated hydrogen peroxide-water product at a lower cost than that possible by any other route.

Yet another embodiment of the invention is to employ an internal catalyst structure within the reactor itself upon which is deposited the catalyst and acid stabilizer to replace the use of a catalyst slurry normally employed. Such an approach eliminates the need for physically removing the catalyst from the desired peroxide product. The physical structure is of such a design that the established dispersed bubbly flow regime will remain present as the reaction media passes through the catalyst beds. The design will be a series of internal beds, where the hydrogen and oxygen gases are injected to raise the concentration of the peroxide product. Additionally, the required acidity to stabilize the produced peroxide can also be embedded in these structures.

Yet another embodiment of the invention is to employ a totally circular route reactor rather than a reactor of long vertical pipes or cylinders connected together with 180° full U-bends. This arrangement substantially lowers the potential of physical erosion-corrosion degradation from occurring to the reactor components, particularly at changes in direction. Correspondingly, it will also reduce the level of attrition/physical damage to the catalyst as it is circulating through the reaction system.

A further embodiment of the invention is to furnish a duplex stainless steel having a PREN value over 34. Such a material offers the advantages of substantially higher strength, more corrosion resistance, increased hardness, and thinner reactor walls to permit higher flow rates through the reactor and a better heat transfer to the coolant outside the reactor containment walls.

BRIEF DESCRIPTION OF THE DRAWINGS

The accompanying drawings, which are incorporated in and constitute a part of the specification, illustrate an exemplary embodiment of the present invention.

DETAILED DESCRIPTION OF THE INVENTION

Elongated Cylinder Reactor System Continuous Production

Figure 1:
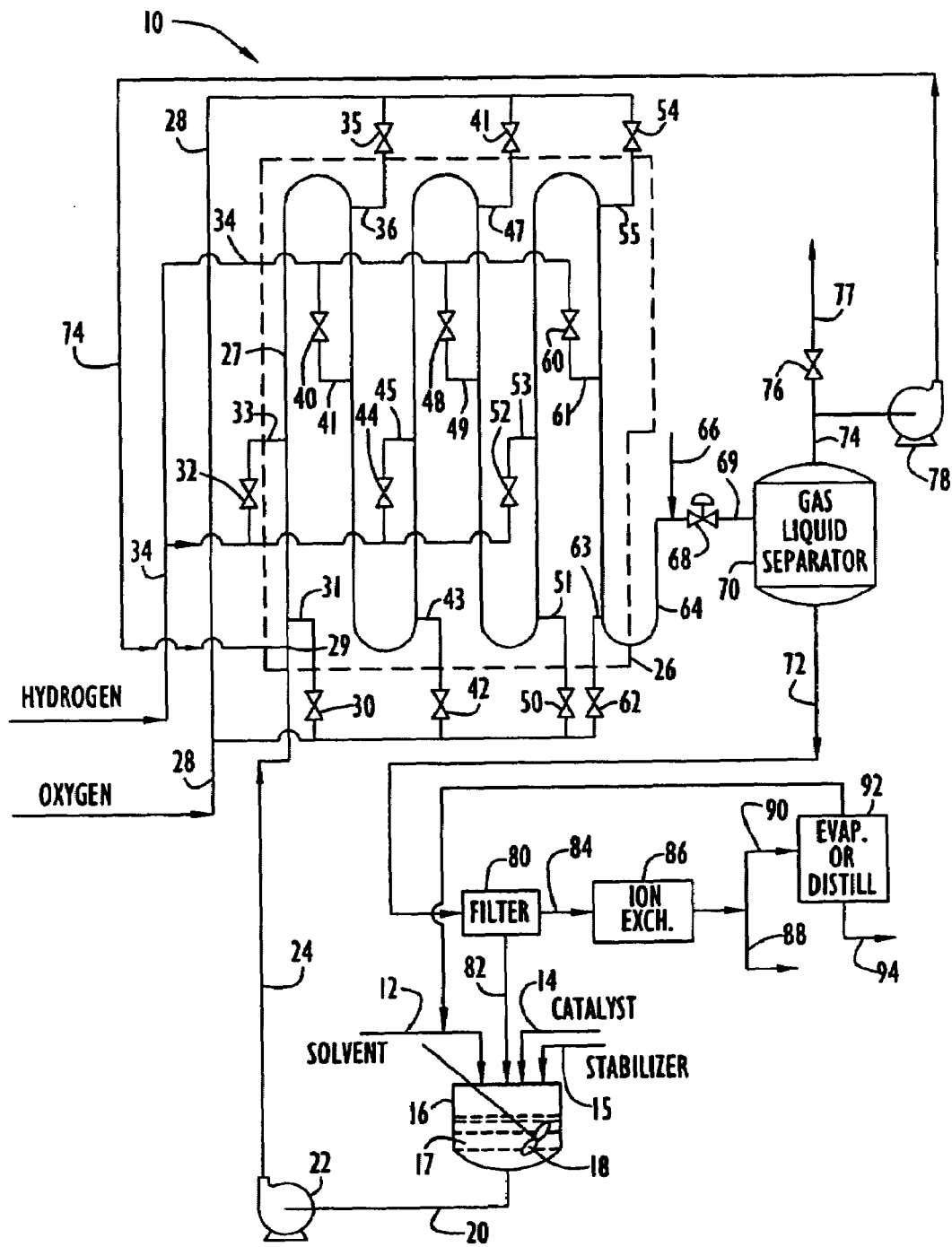
FIG. 1 is a schematic diagram of a reaction system for continuously producing hydrogen peroxide from hydrogen and oxygen according to an exemplary embodiment of the invention.

FIG. 1 illustrates a schematic view of the apparatus 10 for producing hydrogen peroxide from hydrogen and oxygen. Reaction medium 12 and catalyst 14 are added to tank 16. Catalyst 14 is preferably a supported Group VIII metal catalyst. Examples of reaction media include water-soluble organic solvents, water-insoluble organic solvents, water-insoluble organic solvents in combination with water, liquid carbon dioxide and supercritical carbon dioxide. The reaction media are described in greater detail below. Catalyst 14 is, for example, palladium, platinum, iridium, rhodium or mixtures thereof. Examples of a support useful for supporting the catalyst in a dispersed fashion include, but are not limited to, carbon, silica, alumina, titania, niobium oxide, tantalum oxide, or oxides, carbonates or sulfates of alkaline-earth metals (group IIA). It will be appreciated that other catalysts known in the art of hydrogen peroxide production can be used in the present invention.

For example, an amount of hydrogen peroxide stabilizer 15 is added to tank 16. Stabilizer 15 can be an acidic solution having a pH in the range of about one to seven, preferably in the range of one to three. Examples of acids useful for the present invention are hydrochloric, phosphoric, hydrobromic, sulfuric and other commercially available inorganic acids and salts thereof, e.g., sodium bromide alone or in combination with more than one. Typically, the amount of stabilizer 15 added to the solvent is less than about ten percent of the reaction medium. Solution 17 within tank 16 can be stirred with a manual or automatic agitation means 18.

Solution stream 20 is circulated with recirculating pump 22 as input stream 24. Liquid stream 24 is received at pipeline reactor 26 and fills pipes 27 of pipeline reactor 26. Liquid stream 24 has a flow velocity of greater than four feet per second for avoiding the presence of a continuous gas phase or elongated bubbles within reactor 26. It is known that dispersed bubble regime occurs, when the reaction medium has a velocity of greater than four feet per second.

For example, the flow velocity of liquid stream 24 is in the range of more than four feet per second to about twenty feet per second. Moreover, the flow velocity of liquid stream 24 is in the range of about four to about fifteen feet per second. At higher velocities the pressure drop through the pipe becomes too great and catalyst can be damaged through attrition. In addition, the reactor walls could be damaged by erosion.

Pipeline reactor 26 is formed of a plurality of pipes 27 joined with 180° bends. Joined pipes 27 can be arranged either vertically or horizontally. It has been found that significant advantages are achieved where the reactor pipes are vertically oriented. This avoids accumulation of gas bubbles in the area at the top of horizontally oriented pipes. The gas bubbles remain uniformly distributed in a vertical pipe, each surrounded by enough liquid to be cooled as the reaction occurs. Use of vertical pipes also avoids the necessity of installing baffling within horizontal pipes to keep the gas liquid mixture fully mixed.

The length and diameter of pipes 27 are predetermined for providing the desired flow velocity. For example, pipes 27 are formed of a commercially available heavy wall pipe such as a U.S. schedule 40, 80 or 160, which has a wall thickness from 0.109 to 1.312 inches over the size range of a half-inch to twelve inches, are useful for practice.

The preferred length of pipeline reactor 26 can vary widely depending on the number of joined pipes 27 used in the reactor. Typically, joined pipes 27 have a total length in the range of about fifty to about fifty thousand feet. For example, joined pipes 27 have a length of about one thousand to about twenty thousand feet.

It will be appreciated that the number of pipes 27 used in pipeline reactor 26 can be varied to change the number of injection points or passes in the pipeline reactor 26. Moreover, the number of passes of pipeline reactor 26 is between about six and about five hundred passes. The pipeline reactor 26 operates at a pressure in the range from 300 to about 4000-psi. The pressure is desirably above 500 psi (approximately 34 atm.), preferably is above 1000 psi and most advantageously is in the range of 1000 to 3000 psi. Another advantage of higher pressure is that the higher the pressure, the greater the solubility of hydrogen and oxygen in solution. By increasing the reaction system pressure, it is possible to produce more hydrogen peroxide per unit time in a reactor of given volume.

The reaction temperature normally is in the range of 0° C. to 60° C. For example, the temperature can be about 20° C. The lower the temperature of the reaction medium, the higher the solubility of hydrogen and oxygen is in solution. The reaction temperature can be maintained by providing jacketing on each pipe 27 or by installing the entire pipeline reactor 26 within a vessel, in which a refrigerant is being evaporated and the condensed liquid is returned or a recirculating chilled liquid is used. It has been found that best results can be obtained, if the entire pipeline reactor is substantially continuously cooled during operation.

It has been found that it is critical to maintain the ratio of the volumetric flows of the reaction medium and the aggregate flows of the gaseous hydrogen and oxygen at a level, which ensures that the system remains within the dispersed bubbly flow regime. The choice of volumetric flow ratio is within the skill of the reactor operator. Advantages in productivity are achieved by operating at lower L/G ratios, desirably 2 to 100, preferably 10 to 20. However, where that ratio is too low, the system will not be in a dispersed bubbly flow regime, leading to the possibility of an elongated bubble or slug flow regimes, both of which cannot be quench cooled because of the presence of large unstable bubbles with inadequate liquid around each bubble. Each bubble is surrounded by enough liquid phase reaction media, such that any reaction that may occur if the contents of the bubbles react, are fully quenched. Statistically, the local increase of the temperature due to the reaction of hydrogen and oxygen bubbles to form water is desirably less than 3° C. This is achieved with the volumetric flow rates and velocities of the invention.

A recycle gas stream containing hydrogen, oxygen and a diluent such as nitrogen is first injected into the liquid stream at point 29. A gaseous stream of oxygen 28 is then injected by valve 30 into a flowing liquid stream 24 at point 31. A portion of the oxygen is dissolved into a liquid stream 24. A gaseous stream of hydrogen 34 is injected by valve 32 into liquid stream 24 at point 33 where the hydrogen starts to dissolve into the reaction media. Within pipeline reactor 26, the dissolved gases react to form hydrogen peroxide in solution. These gases will be continuously dissolving and reacting in the reaction media.

Gaseous hydrogen 34 and gaseous oxygen 28 are each sparged into liquid stream 24 by a small diameter nozzle or multi nozzles for producing a plurality of minute bubbles. For example, the nozzle has a diameter in the range of about 0.01 inches to about 0.50 inches to produce fine bubbles, which are surrounded by rapidly flowing liquid stream 24. The minute bubbles of hydrogen and oxygen are of a size which are small enough to be surrounded by flowing liquid stream 24. The volume of liquid stream is sufficiently large and continuous so that in the event of any rapid reaction within a bubble, the surrounding liquid can expeditiously quench the rapid reaction within the bubble to prevent the propagation of the reaction throughout the entire regime of the reactor. The flow rate of liquid stream 24 and the injection of minute bubbles provides a dispersed bubbly flow regime in liquid stream 24.

As the gases become depleted, additional gaseous hydrogen 34 can be injected at a plurality of passes through pipeline reactor 26 with respective valves 40, 44, 48, 52 and 60 at points 41, 45, 49, 53 and 61 for dissolution into liquid stream 24. Additional gaseous oxygen 28 can be injected downstream of hydrogen with respective valves 35, 42, 46, 50, 54 and 62 at respective points 36, 43, 47, 51, 55 and 63 for reacting with the dissolved hydrogen. For example, the point of oxygen introduction is sufficiently distanced from that of hydrogen injection to permit the hydrogen to have become distributed throughout the reaction medium as tiny dispersed bubbles and to permit a major portion of it to dissolve in the reaction medium.

For example, the second volume of hydrogen and subsequent volumes of hydrogen introduced along the elongated reaction zone are introduced after about fifty percent of the previously introduced hydrogen has been reacted with oxygen and preferably after at least seventy-five percent of the previously introduced hydrogen has been reacted.

After the multi-pass reaction, stream 64 flows from pipeline reactor 26. In the event the off-gas from the reactor is in the flammable range, a diluent gas 66 can be added to stream 64. An example of a diluent gas useful for practice of the invention is nitrogen or other inert gas. It has been found that air can be used in place of nitrogen. While calculations with respect to the mixture in the reactor vent must be made, it is possible to achieve substantial economies by using air as the inert gas rather than pure nitrogen.

A pressure letdown valve 68 can be used before gas-liquid separator 70 for reducing the pressure of the inlet mixture 69 to gas-liquid separator 70. Gas liquid separator 70 separates liquid 72 from gas 74. Gas 74 containing unreacted oxygen, possibly nitrogen and some unreacted hydrogen from separator 70 can be recycled with recycle gas compressor 78 and can be injected at point 29 into liquid stream 24. This provides for safer operation as discussed above. Alternatively, separated gas 74 can be purged with valve 76 in exit line 77. It will be appreciated that a gas liquid separator useful for practice of the invention is known in the art. Liquid stream 72 can be received at additional pipeline reactors 26 for connecting the reactors in series after gas liquid separator 70.

Separated liquid 72 containing the hydrogen peroxide product in the reaction medium containing catalyst and/or acid is passed to a filter 80 for recovering the catalyst as filter cake 82 or the catalyst may be recovered in a centrifuge or multi-stage cyclone. Filter cake 82 can be added to tank 16 for recycling the catalyst. Filtrate 84 includes the hydrogen peroxide product and the reaction medium with acid. Filtrate 84 is received at ion exchange apparatus 86 for removing the acid from the filtrate. Hydrogen peroxide product 88 from ion exchange apparatus 86 can be directly used as a hydrogen peroxide product. Alternatively, hydrogen peroxide product 88 can be received at column 90 for concentrating the hydrogen peroxide product 88 in order to produce a concentrated hydrogen peroxide product 94. Column 90 can be an evaporation or distillation column. Solvent 92 removed from column 90 can be recycled into solvent stream 12 as make-up.

The concentration of hydrogen peroxide product 88 produced by pipeline reactor 26 depends on the number of injections of hydrogen and oxygen in the passes of pipeline reactor 26 or in its recycle back to front of the reactor. For example, hydrogen peroxide product 88 has a concentration in the range of about one percent to about thirty-one percent of hydrogen peroxide in solution. Furthermore, hydrogen peroxide product 94 has up to seventy percent concentration or higher.

The invention has the advantage of providing an economical and safe process for producing hydrogen peroxide. The process does not specifically inject an inert gas or chemical agent within the reactor, thereby reducing costs. The entire regime of the pipeline reactor comprises a dispersed bubbly regime in a rapidly flowing liquid stream for preventing the formation of an explosive gas phase within the reactor.

The entire reactor is utilized for the production of the hydrogen peroxide. In addition, the high surface to volume relationship of the reactor provides inexpensive removal of heat from the reactor.

Elongated Cylinder Reaction System
Semi-Continuous Production

Figure 2:
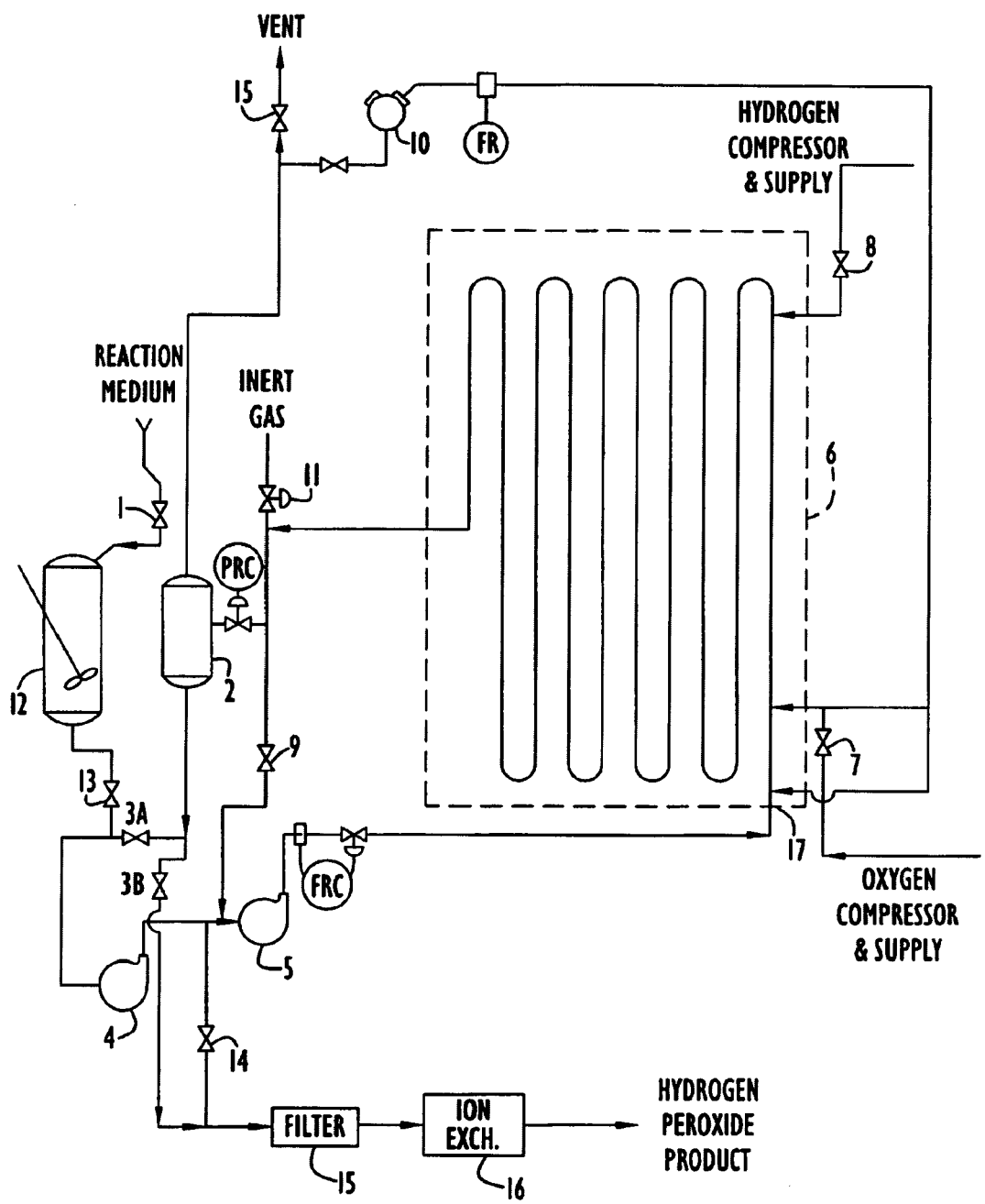
FIG. 2 is a schematic diagram of a reaction system for producing hydrogen peroxide in a semi-continuous batch process according to another exemplary embodiment of the invention.

FIG. 2 illustrates this mode of operation. The basic system is the same as for continuous operation (FIG. 1), except there are considerably less injection points for hydrogen and oxygen. The reaction media is recycled by pump 5 for a period of time to build up the concentration of hydrogen peroxide, while no new solvent, catalyst or stabilizer is added to the reactor. Additionally, no product is taken from the reaction system. The recycle of the reaction media can be performed by directly recycle through valve 9 to pump 5 or the reaction effluent can pass through separator 2, valve 3a to charge pump 4 with liquid recirculated by pump 5 and the gases by compressor 10 through point 17.

The reactor charge is introduced by valve 1 to feed tank 12. The charge consists of the solvent, acid stabilizer and catalyst in the form of a slurry or alternately an internal catalyst structure. It is then fed into the reaction system through valve 13, pumps 4 and 5.

Oxygen 7 and hydrogen 8 gases are continuously injected at all times, even when the hydrogen peroxide concentration reaches the desired level. Fresh feed of solvent, catalyst and stabilizer is added to the reactor, while the contents in the reactor are first gas-liquid-separated in separator 2, passing though valve 3b, solid-liquid separated in filter 15 and ion exchanged in 16. Inert gas such as nitrogen or air can be added through valve 11 to assure that the exit gas is outside the flammable range of hydrogen with oxygen and diluents.

By employing highly turbulent liquid flow, essentially plug flow transfer of the completed reaction batch will occur. Instruments will monitor the concentration of hydrogen peroxide to discontinue product removal at the appropriate time. Similarly, the flow of fresh reaction mixture will be charged to the reaction system, so that the reactor will be completely liquid filled.

The method of operation for gas injection, product removal, separation of the gas and liquid phase, filtration and ion exchange are essentially the same as for continuous production as described for FIG. 1 above.

Circular Path Reactor System

Figures 4A, 4B:
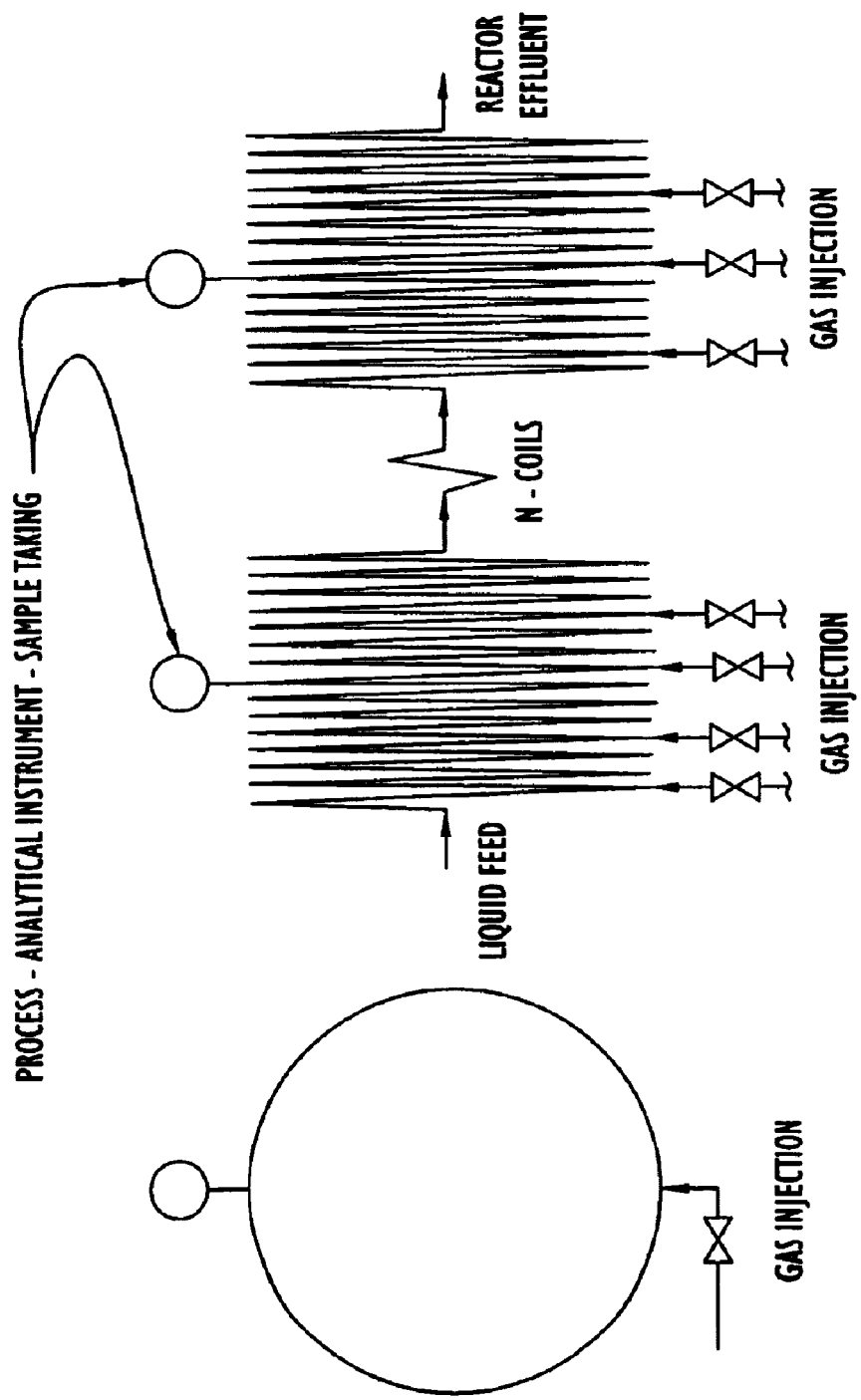
FIGS. 4a and 4b are schematic diagrams of end and side views of a circular reaction system according to an exemplary embodiment of the invention.

In the above elongated cylinder reactor system, or pipeline reactor system, the path of the liquid phase reaction medium follows a straight pipe design with 180° U-bends at the end of each straight length. This straight path can be replaced with a circular path as shown in FIGS. 4a and 4b. FIG. 4a shows an end view of a circular path reactor.

FIG. 4b shows a side view of a plurality of circular paths arranged in a vertical orientation for use in the reactor. As with the straight tube U-bend reactor path, the circular path reactor system includes multiple injection sites for hydrogen and oxygen gases. As the only change is the elimination of sharp (180°) change in direction from the earlier discussed reaction system, the system design parameters will remain the same in regards to fluid velocities, L/G ratios, distance between hydrogen and oxygen injection points, the chemical ingredients in the reactor itself, the catalyst and the system operating pressure and temperature.

The use of a circular path reactor will substantially reduce the potential for physical damage (attrition) to the suspended catalyst slurry in the reaction media and to minimize the potential for physical damage (erosion or erosion-corrosion) to the reactor pressure components that occurs at changes in direction.

The diameter of the individual coils for the reactor is set by local area restraints within or outside of a building, the desired concentration of the hydrogen peroxide product and the plant's capacity. For a typical 100,000,000 pounds per year plant, the diameter of an individual coil could be 20 feet with up to 100 coils for this capacity.

Internal Catalyst System

Figures 5A, 5B:
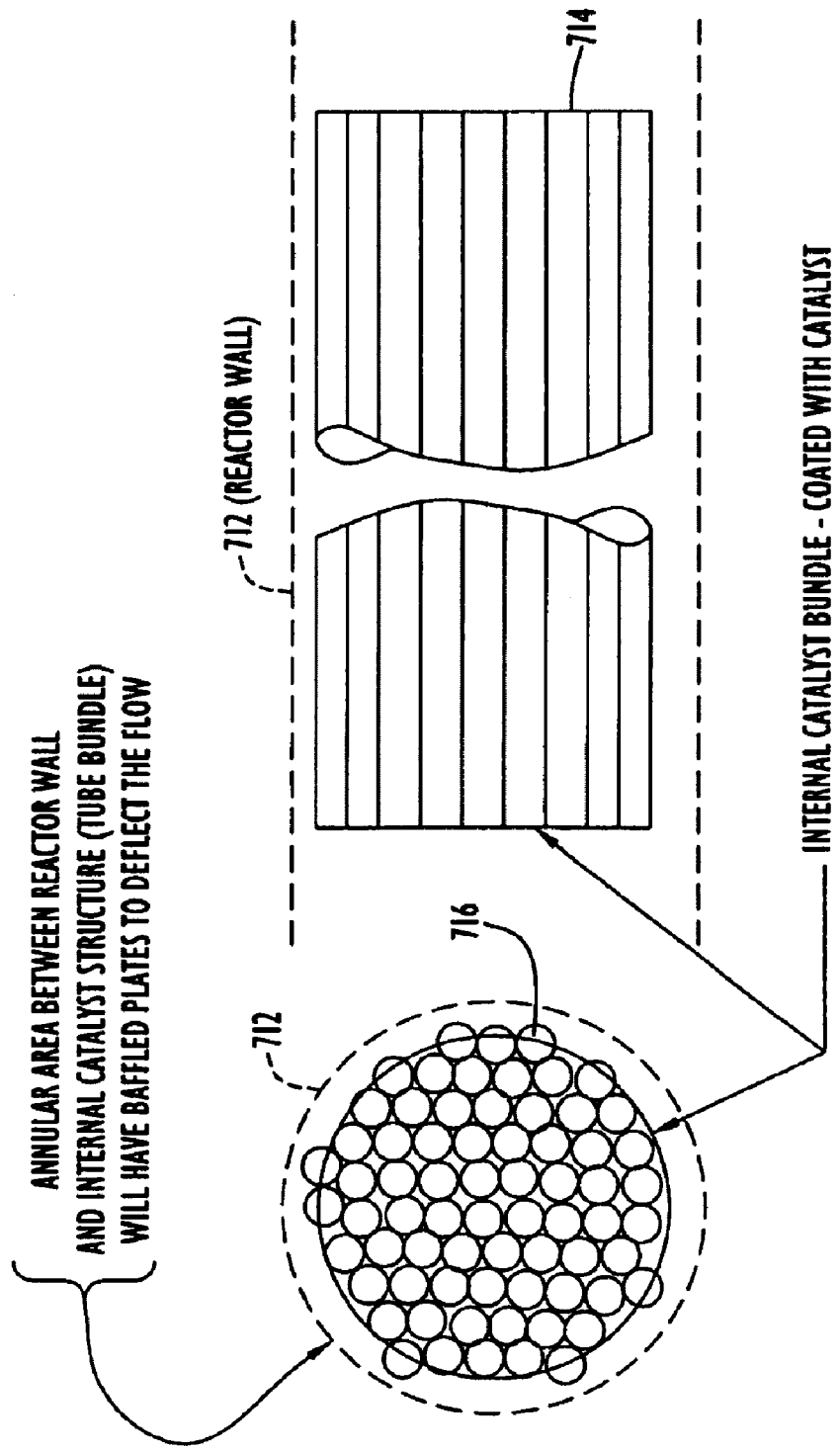
FIGS. 5a and 5b are schematic diagrams of the end and side views of an internal catalyst structure according to an exemplary embodiment of the invention.

Referring to FIG. 5 refers to an internal catalyst system for use in any of the reactor systems disclosed above. FIG. 5a shows the end view and FIG. 5b shows the side view of an internal catalyst system.

In FIG. 5, within reactor wall 712 is bundle 714 of tubes 716 orientated co-axially, i.e., parallel to the direction of the flow of the liquid phase reaction medium. Reactor wall 712 is an elongated cylinder as disclosed above. Bundle 714 can totally occupy the entire cross-sectional area.

Each tube 716 is of a small outside diameter (5–20 mm) or preferably 8–12 mm in outside diameter. Deposited on the inner surfaces of tubes 716 as needed is either an active metal catalyst or a catalyst support material such as alumina, silica, carbon or an oxide, carbonate or sulfate of an alkaline earth metal, upon which is deposited an active metal catalyst. The active metal catalyst is, for example, a Group VIII metal. Group VIII metals include, but are not limited to, palladium, platinum, iridium, rhodium or any combination thereof. Tubes 716 themselves can be composed of metal or ceramic. The required acidity to stabilize the hydrogen peroxide formed can also be deposited upon these structures.

For a typical plant, using 3" schedule 80 pipe, there would be approximately 79-8 mm O.D. tubes in a bundle to fill inside the pipe. This gives approximately 52% open tube area for a 1 mm tube thickness. Alternately, the internal catalyst structure can be spaced within the reactor with the average clearance approximately equal or less than the diameter of tube in the tube bundle. Under these conditions, the tube open area is approximately 45% of the pipe's open area, and the annular area outside the bundle another 15–20% open area. Laboratory tests have shown that dispersed bubbly flow can be maintained in 8–10 mm tubes at velocities of four feet per second.

In this arrangement, the reaction can be continuously cooled by the reactor external jackets. Additionally, the deflection baffles and the inside wall of the reactor for the latter case can be coated with catalyst to raise the productivity of the system.

Within a reactor system, the reactor includes banks of tubes 716. Each bank is separated by a mixing zone, wherein the reactants flowing within each tube 716 is intermixed. Into these mix zones, hydrogen and oxygen can be introduced periodically. Baffles will be provided to properly redistribute the gas and liquid before entering the next catalyst bundle. The number of bundles is determined by the desired increase in hydrogen peroxide product concentration. Typically 6–200 tube bundles will be provided.

Description of Preferred Solvents Water-Soluble Organic Solvents as Reaction Medium In an exemplary embodiment of the present invention, FIG. 1, hydrogen peroxide is prepared directly from hydrogen and oxygen in a water-soluble organic medium. The liquid phase reaction medium contains an organic compound that is essentially miscible with water.

The term "essentially" means that at least about ninety-five percent of the organic compound is soluble in water.

Examples of organic compounds that are essentially miscible with water include, but are not limited to, oxygenated organic compounds that have one to four carbon atoms. For example, methanol, ethanol, isopropanol, acetone and tertiary butanol, all are completely miscible with water.

The advantage of using a liquid phase reaction medium containing an organic solvent is that the solubility of both hydrogen and oxygen are greatly improved over their solubilities in water. A comparison of the relative solubility of hydrogen and oxygen in different solvents at the same temperature points up the advantage of using organic solvents rather than water as the reaction media:

|  | Solubility of Hydrogen | Solubility of Oxygen |
|---|---|---|
| Water | 1 | 24.7 |
| Methanol | 4.88 | 200 |
| Acetone | 5.03 | 224.7 |

Because the hydrogen and oxygen enter the reaction medium more readily in water soluble organics, the formation of hydrogen peroxide will be more rapid. Additionally, the selectivity of the reaction may also increase because of shorter resident times resulting in lower capital and operating costs. Another advantage is that the use of an organic solvent lowers the probability of the metal catalyst leaching off of its support into the reaction medium. Instead of using an acid to acidify the liquid phase reaction medium, organic compounds that have been modified with acidic functional groups can be utilized.

For example, organic solvents that have been modified with sulfur, phosphorus, chlorine, bromine or fluorine or any combination thereof containing groups can provide the requisite acidity for the reaction. The product produced is hydrogen peroxide in a water-soluble organic solvent. The hydrogen peroxide product can be used as-is in several applications. For example, hydrogen peroxide in methanol is preferred by some as an oxidant to produce propylene oxide, phenol, caprolactam and other oxygenated petrochemicals.

Water-Insoluble Organic Solvents as Reaction Medium

In another exemplary embodiment of the invention, a water-insoluble organic solvent can be employed where the desired peroxide can be water extracted to give hydrogen peroxide with water.

In this embodiment, the reaction medium contains an organic solvent that is immiscible with water. The term "insoluble" is defined to mean an organic solvent, whose solubility is less than ten grams per hundred grams of water at 20° C.

Representative examples of insoluble organic compounds are listed in Table 1 together with their molecular weights, atmospheric boiling points and solubility. In addition to the solvents listed in Table 1, other useful insoluble organic compounds include, but are not limited to, chlorocarbons, bromocarbons or chlorofluorocarbons. It is desirable for the insoluble organic solvents to be nonflammable.

TABLE 1

| Organic Compound | Mol. Wgt. | Boiling Pt. (° C.) | Solubility in Water (100 parts water) |
|---|---|---|---|
| n-amyl alcohol | 88.15 | 137.9 | $2.7^{22*}$ |
| pentanol-2 | 88.15 | 119.5 | $4^{20}$ |
| 2 methyl butanol-4 | 88.15 | 132.0 | $2^{14}$ |
| 2 methyl butanol-3 | 88.15 | 113–14 | $2.8^{30}$ |
| 2 methyl butanol-2 | 88.15 | 102 | 51.5 |
| active amyl alcohol | 88.15 | 128 | $3.6^{30}$ |
| benzyl alcohol | 108.13 | 204.7 | $4^{17}$ |
| n-butanol | 74.12 | 117 | $9^{15}$ |
| sec-butanol | 74.12 | 99.5 | $12.5^{20}$ |
| cyclohexanol | 100.16 | 160–61 | $3.6^{20}$ |
| cyclopentanol | 84.16 | 129.30 | very slightly soluble |
| dimethyl carbonate | 90.08 | 89–90 | insoluble |
| diethyl carbonate | 118.13 | 126 | insoluble |
| n-hexyl alcohol | 102.17 | 157.2 | 0.6 |
| n-actyl alcohol | 130.22 | 194.5 | 0.054 |

*Smaller case refers to the temperature (° C.) for the solubility measurement.

The advantages of using a water-insoluble, organic solvent are similar to those when using a water-soluble organic solvent, i.e., increased solubility of hydrogen and oxygen in the liquid phase reaction medium resulting in lower capital and operating costs.

Likewise, to provide the necessary acidity for the reaction, the water-insoluble organic compound can contain acidic functional groups, for example functional groups containing sulfur, phosphorus, chlorine or bromine.

The hydrogen peroxide product yielded from this reaction medium is hydrogen peroxide in the water-insoluble organic solvent. An aqueous hydrogen peroxide product can be produced by conducting a solvent extraction process with water. The solvent extraction can operate in a continuous liquid phase with no heat input.

Figure 3:
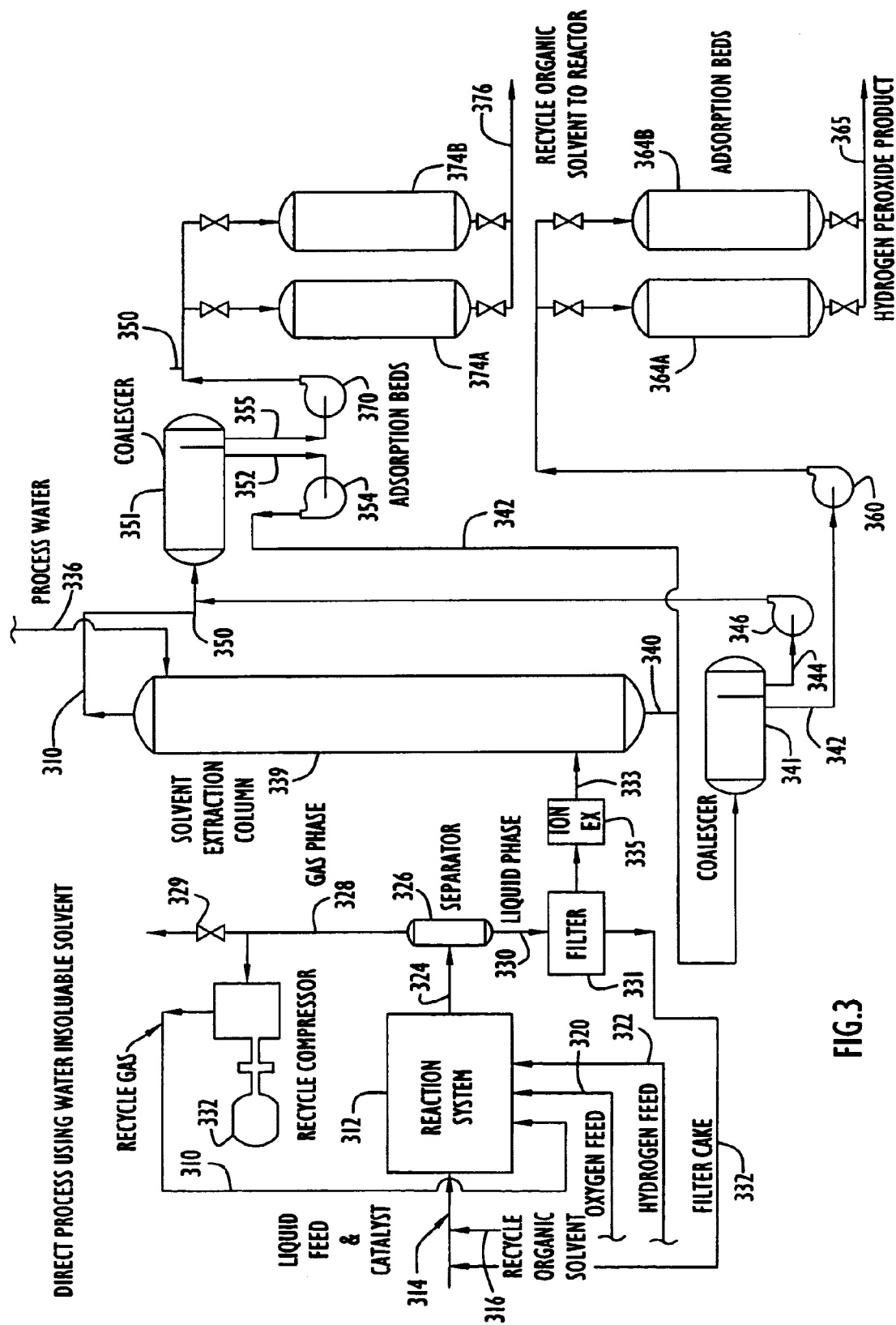
FIG. 3 is a schematic diagram of a reaction system for producing hydrogen peroxide in a water-insoluble organic solvent and then extracting the hydrogen peroxide into a water solution utilizing a solvent extraction column.

Referring to FIG. 3, reference numeral 310 refers generally to a process flow sheet for reacting hydrogen and oxygen in a water-insoluble organic solvent and recovering the hydrogen peroxide from therein in an aqueous solution. The feed to the reaction system includes a liquid reaction medium containing a suspended slurry of solid catalyst particles 314, a recycle stream of organic water-insoluble solvent 316, recycle gas stream of hydrogen, oxygen and nitrogen 310, a fresh oxygen feed 320, and a fresh hydrogen feed 322. The reaction system may alternatively be comprised of a long cylindrical reaction vessel containing a plurality of internal catalyst structures rather than a suspended catalyst slurry. The reaction medium is preferably a water-insoluble organic solvent.

The effluent from the reaction system 324 passes to separator 326, where a gas stream 328 comprising unreacted hydrogen and oxygen is separated from the liquid phase reactor effluent 330. Some gas will be vented through valve 329. Unreacted hydrogen, oxygen and possibly nitrogen 328 are recycled by compressor 332, which returns the unreacted gases to the reaction system.

The effluent 330 is sent to filter 331, if a catalyst slurry is used. The filter cake 332 is reslurried with the reactor solvent to be refed to the reaction system 312. If an acid is present, it can be removed in an ion exchange unit 335.

The filtrate 333 passes to a counter-current solvent extraction column 334 wherein it is contacted with process water 336. The hydrogen peroxide enters the water phase in column 334 and exits as stream 340. It then passes to the coalescer 341, where the trace quantity of organic 344 is separated from the desired aqueous hydrogen peroxide product 342. Stream 344 is recycled via pump 346 to decanter-coalescer 351 for secondary separation. The organic phase 350 passes from the top of solvent extraction column 334 to decanter-coalescer 351. The heavier aqueous stream 352 separated in coalescer 351 flows to pump 354, where it joins the aqueous phase from the solvent extraction column 334 to enter coalescer 341. The aqueous product 342 from pump 360 passes to absorption beds 364a and 364b wherein trace organics are removed. The aqueous hydrogen peroxide product 365 passes to storage. The lighter, organic phase 355 from decanter-coalescer 351 flows to pump 370 to adsorption beds 374a and 374b, wherein trace amounts of water are removed. The water-free organic phase 376 is recycled to the solvent extraction column.

Water-Insoluble Organic Solvent and Water as Reaction Medium

According to another exemplary embodiment, water can be used along with a water-insoluble organic compound to form a two-phase reaction medium. For example, the reaction medium contains a combination of water and cyclopentanol.

The presence of the organic compound allows the hydrogen and oxygen to solubilize into the reaction medium more readily to form hydrogen peroxide. The hydrogen peroxide can partition from the organic compound and into the water phase of the reaction medium. The effluent from the reactor first passes through a gas-liquid separator to separate the gas from the liquid phase. This is followed by a liquid phase separator that separates the water-insoluble organic compound from the water phase. The resulting product would be an aqueous solution of hydrogen peroxide.

Carbon Dioxide as Reaction Medium

In still another exemplary embodiment of the present invention, carbon dioxide can be used as the reaction medium. The carbon dioxide can be used as liquid carbon dioxide or as supercritical carbon dioxide. Carbon dioxide occurs as a liquid between the temperature of −56.6° C. (its triple point) and 31.1° C. (its critical temperature when subjected to an elevated pressure of at least 5 atmospheres at its triple point and 73 atmospheres or more at its critical point). The higher pressure is compatible with operating pressures employed in the direct reaction of producing hydrogen peroxide with any solvent.

For supercritical carbon dioxide (carbon dioxide under conditions of pressure and temperature above carbon dioxide's critical pressure and critical temperature (73 atmospheres (1073 psi) and 31.1° C. respectively), offers advantages in that its properties are between those of a gas and a liquid. Supercritical carbon dioxide has liquid-like density and solvation strength but its transport properties, for example viscosities and diffusivities, resemble more that of a gas. Both liquid and supercritical carbon dioxide have the additional advantages of being nonflammable, nontoxic, and environmentally friendly.

The solubility of both hydrogen and oxygen are high in liquid carbon dioxide. Hydrogen and oxygen are fully miscible in supercritical carbon dioxide (above 31° C. and 73 atmospheres). These properties lead to a much smaller and hence less expensive reaction system. Water or an organic such as methanol or acetone can be either added to the reactor or preferably be added to the reactor effluent before the product is discharged from the reactor.

Because of its low boiling point, all of the carbon dioxide vaporizes leaving an aqueous or organic solution of hydrogen peroxide. The vaporized carbon dioxide can be recompressed, condensed and recycled. This embodiment of the invention leads to major cost savings over the use of any other solvent in the reaction system.

Duplex Stainless Steel as the Material of Construction

In yet another embodiment of the current invention, the use of a duplex stainless steel provides several significant advantages over any other material for this service. While there are several duplex stainless steels being produced, our interest is focused upon stainless steels that have a PREN number in excess of 34. PREN number=% chromium+ 3.3×% molybdenum+16×% nitrogen. Such a stainless steel has excellent corrosion resistant property, high tensile strength, high hardness value, all at a nominal premium in price over standard type 316 austenistic stainless steel. Its strength is sufficiently above conventional stainless so that the wall thickness of the reactor wall (pipe) can be vastly cut down in thickness usually by one pipe schedule rating. Besides this saving in material weight, the greater open cross sectional area permits a greater flow volume at the same velocity and better heat removal capacity from a thinner wall and greater internal pipe area.

EXAMPLE 1

Continuous Process

A continuous methanol stream of a suspended group VIII metal catalyst deposited on an inert carrier with an acid stabilizer is fed at a pressure of 125 atmospheres (1840 p.s.i.) and a flow rate of 166,000 pounds per hour to a tubular reactor as shown in FIG. 1. The reactor consists of 4" schedule 80 of a duplex stainless steel 7000 feet in length. The liquid flow rate is 11.7 feet per second. The liquid enters the reactor at 15° C.

At the reactor inlet a recycle gas stream from reactor's downstream separator is introduced into the liquid feed stream. This is followed by the injection of 1850 pounds per hour of oxygen through a nozzle to form fine individual bubbles in the liquid stream. This produces a bubbly flow regime with a continuous liquid phase and small evenly dispersed individual bubbles. Downstream after a portion of the oxygen bubbles have been dissolved into the liquid phase, hydrogen gas is injected at the rate of 115 pounds per hour as finely dispersed bubbles, which react with the oxygen to form hydrogen peroxide. This is followed by repeated injections of first oxygen and then hydrogen to form hydrogen peroxide of increasing concentration. The total number of gas injections determines the final hydrogen peroxide concentration.

The heat of reaction is continuously removed by the circulation of a cooling agent such as chilled water or refrigerant on the outside of the reactor walls.

The effluent from the reactor passes through a pressure letdown valve at the entrance to the gas-liquid separator.

Nitrogen or preferably air is added to the reactor effluent as needed to assure that the exit gas from the separator is outside the explosive/flammable limits of hydrogen and oxygen. This gas can be either recycled back to the inlet of the reactor or vented to atmosphere.

The liquid phase of the reactor's effluent is filtered, centrifuged or cyclone separated to remove the suspended catalyst slurry, so that it can be resuspended in the reactor medium in the reactor's feed tank. In this tank, the concentration of each ingredient is checked and adjusted as needed. This includes the acid used as the stabilizer for hydrogen peroxide. Alternately the catalyst can be deposited upon a fixed structure of parallel small diameter tubes of a sufficient size to maintain a dispersed bubbly flow regime, thus avoiding this need for separate downstream filtration-centrifugation-cyclonic separation of the catalyst particles.

The filtrate that contains the desired hydrogen peroxide product passes over an ion exchange or equal agent to remove residual acid values from the hydrogen peroxide product. Again alternately the required acid value can be deposited upon the internal catalyst supports that are inserted within the reactor to meet the required level of hydrogen peroxide stabilization. This product can then be used directly or can be concentrated in an evaporator and/or distillation column to concentrations up to 70% or more following conventional practices. A total production of 100,000,000 pounds per year of hydrogen peroxide can be generated in the equipment and operations outlined above.

EXAMPLE 2

Batch Semicontinuous Process

FIG. 2 illustrates an alternate mode of operating the process of the invention in a batch semicontinuous manner. Such operation is appropriate for small capacity plants. A fresh batch of reaction medium consisting of a group VIII metal catalyst on an inert support in an organic or C-bearing solvent with an acid stabilizer is charged to the reactor through valve 1 to feed tank 12. It is then transferred by opening valve 13 to charge pump 4. From here it will be circulated through the reactor 6 via circulating pump 5. Some inert gas can first be added at point 11 to separator 2 to compressor 10. Oxygen gas will be injected through a nozzle to form a dispersed bubbly flow regime by opening valve 7. After at least 50% of the oxygen is dissolved, hydrogen gas will be injected using valve 8. The reactor liquid content will be circulated while these feed gases are being injected with valve 9 open. When the desired concentration of hydrogen peroxide is reached, the PRC before separator 2 will be activated while closing valve 9. The concentration of hydrogen in the effluent will be determined so that nitrogen or air can be added through valve 11, if needed safety wise.

The reaction effluent will pass to separator 2, where the gas phase is separated from the liquid phase. The gas can be either sent to atmosphere via valve 15 or recycled by compressor 10 back to the reaction system. The liquid stream containing the desired hydrogen peroxide will be removed through valve 3b. The peroxide product will be filtered to remove the catalyst particles in filter 15 so that they can be recycled. This will be followed by removal of the acidity in the reactor effluent in item 16. Alternately these latter two operations can be avoided, if internal catalyst structures are provided.

The system will be operated at 1000 p.s.i. or greater with a liquid velocity in excess of four feet per second and an operating temperature between 5 and 50° C. External reactor cooling will be provided by either a circulating chilled water or refrigeration is employed. The above cycle will be repeated producing hydrogen peroxide at the desired concentration and volume. This batch semicontinuous procedure can be employed to produce product from 500,000 to 20,000,000 pounds per year.

EXAMPLE 3

Carbon Dioxide as the Reaction Medium

This process is carried out in reaction system shown in FIG. 1 and makes hydrogen peroxide at both high activity and yield. The productivity of the reaction system can be considerably increased by charging the system with liquid carbon dioxide. The catalyst is a group VIII metal deposited upon an inert support on either individual particles as a slurry or fixed in place upon a number of internal catalyst supports. The acid stabilizer can be either in solution or deposited upon the fixed structure. The carbon dioxide will be charged as a liquid in excess of 73 atmospheres (1073 p.s.i.) and below 31° C. The reaction system will be operated by recirculating the reaction medium with the injection of recycle gas followed by the injection of oxygen and hydrogen gases. All these gas injections will be carried out to achieve a bubbly flow regime of small individual bubbles each surrounded by sufficient liquid to quench any reaction that could occur within the bubbles.

As the reaction of hydrogen and oxygen to form hydrogen peroxide is exothermic, the external cooling system on the reactor is operated such that the reaction mixture can be kept below 31° C., the critical temperature of carbon dioxide.

If the temperature exceeds 31° C., the carbon dioxide will become supercritical, where the hydrogen and gas are completely miscible in supercritical carbon dioxide. This will permit the introduction of greater quantities of these gases than is possible with any other solvent. The quantity of gas addition is set by the ability of the reaction system to remove the heat of reaction rather than the conventional case, where the solubility of hydrogen gas into the reaction medium sets the productivity of the reaction system. The removal of the heat of reaction can be carried out by heat transfer across the reactor wall to an external coolant or by allowing some of the carbon dioxide to evaporate from the reaction medium while adding in more liquid carbon dioxide.

What is claimed is:

1. A process for producing a solution of hydrogen peroxide in an organic medium by reaction of hydrogen and oxygen in the presence of a catalyst in said organic medium, comprising the steps of:
    (a) establishing a continuous flow of a liquid phase reaction medium in an elongated reaction zone formed by a plurality of pipe sections in communication with each other, said liquid phase reaction medium comprising an organic compound in the presence of a catalyst for said reaction, and at least one of the pipe sections of the elongated reaction zone includes a plurality of tubes upon which the catalyst is fixed, said tubes being arranged within the elongated reaction zone such that portions of the liquid phase reaction medium flow through said tubes;
    (b) introducing a reactive feed of oxygen and hydrogen into said continuously flowing liquid phase reaction medium to form hydrogen peroxide within said liquid phase reaction medium; and
    (c) separating unreacted gases from said liquid phase reaction medium containing hydrogen peroxide.

2. A process for producing a solution of hydrogen peroxide in an organic medium by reaction of hydrogen and oxygen in the presence of a catalyst in said organic medium, comprising the steps of:
    (a) establishing a continuous flow of a liquid phase reaction medium comprising an organic compound in an elongated reaction zone, wherein at least a portion of the elongated reaction zone includes a plurality of tubes upon which the catalyst is fixed, said tubes being arranged within the elongated reaction zone such that portions of the liquid phase reaction medium flow through said tubes;

(b) introducing a reactive feed of oxygen and hydrogen into said continuously flowing liquid phase reaction medium to form hydrogen peroxide within said liquid phase reaction medium, said hydrogen and oxygen being introduced in sufficient amounts and at selected points distanced from one another along the path of said continuous flow such that dispersed bubbles of hydrogen and oxygen are formed within said continuously flowing liquid phase reaction medium and are sufficiently sized and spaced to prevent the presence of a continuous gas phase within said elongated reaction zone; and (c) separating unreacted gases from said liquid phase reaction medium including hydrogen peroxide.

3. The process of claim 2, wherein the flow of said liquid phase reaction medium to an aggregate flow of all gases in said liquid phase reaction medium is maintained at a volumetric ratio of at least about 2 to 1 in said elongated reaction zone.

4. The process of claim 2, wherein the flow of said liquid phase reaction medium to an aggregate flow of all gases in said liquid phase reaction medium is maintained at a volumetric ratio of at least about 5 to 1 in said elongated reaction zone.

5. The process of claim 2, wherein at least one of nitrogen and air is added to said unreacted gases prior to separation from said liquid phase reaction medium so as to ensure that said unreacted gases are inert.

6. The process of claim 2, further comprising:
(d) substantially continuously cooling said liquid phase reaction medium in at least a portion of said elongated reaction zone.

7. The process of claim 2, wherein at least a portion of said elongated reaction zone is maintained at a pressure of at least about 300 p.s.i.

8. The process of claim 7, wherein said pressure is from about 300 p.s.i. to about 4000 p.s.i.

9. The process of claim 2, wherein each of said oxygen and said hydrogen are introduced into said liquid phase reaction medium at multiple points in said elongated reaction zone.

10. The process of claim 2, wherein each of said dispersed bubbles has a diameter of a size which is small enough to be surrounded and quenched by said liquid phase reaction medium.

11. The process of claim 2, wherein a stabilizer comprising an acid is added to said liquid phase reaction medium.

12. The process of claim 2, wherein the concentration of hydrogen in said liquid phase reaction medium is in the flammable range for a hydrogen and oxygen mixture during formation of at least a portion of said hydrogen peroxide within said elongated reaction zone.

13. The process of claim 2, wherein hydrogen is introduced after the oxygen has become distributed throughout the liquid phase reaction medium as dispersed bubbles and has substantially dissolved therein.

14. The process of claim 2, wherein hydrogen is introduced at a plurality of locations into said liquid phase reaction medium, and at least one volume of hydrogen is introduced after at least about fifty percent of a previously introduced volume of hydrogen has been reacted with oxygen to form hydrogen peroxide.

15. The process of claim 2, wherein said liquid phase reaction medium is maintained at a flow rate of greater than about ten feet per second within said elongated reaction zone.

16. The process of claim 2, wherein said hydrogen peroxide is formed continuously as said liquid phase reaction medium flows through said elongated reaction zone.

17. The process of claim 2, wherein said elongated reaction zone comprises a plurality of elongated and substantially vertically oriented pipes.

18. The process of claim 2, further comprising:
(d) recycling said separated unreacted gases to said elongated reaction zone at a location upstream of the introduction of said reactive feed.

19. The process of claim 2, wherein said elongated reaction zone comprises a series of pipes including a plurality of internal distributors to ensure sufficient mixing of hydrogen and oxygen in said liquid phase reaction medium as well as the prevention of a continuous gas phase within said elongated reaction zone.

20. The process of claim 2, wherein said elongated reaction zone comprises a circular pipe in a vertical orientation.

21. The process of claim 2, wherein the material of construction for portions of said elongated reaction zone in contact with said liquid phase reaction medium is a duplex stainless steel having a PREN number in excess of 34.

22. The process of claim 2, wherein the reaction is carried out in a batch semicontinuous manner.

23. The process of claim 2, wherein the reaction pressure and a volumetric ratio of the flow of said liquid phase reaction medium to the flow of said reactive feed are maintained at sufficient levels within said elongated reaction zone to prevent an explosive reaction between oxygen and hydrogen within said elongated reaction zone.

24. The process of claim 2, wherein the flow of said liquid phase reaction medium to an aggregate flow of total gases in said liquid phase reaction medium is maintained at a volumetric ratio of no greater than about 100 to 1 in said elongated reaction zone.

25. The process of claim 2, wherein about one to fifty moles of oxygen per one mole of hydrogen are introduced into said liquid phase reaction medium.

26. The process of claim 2, further comprising:
(d) separating said catalyst from said liquid phase reaction medium at a location downstream from said elongated reaction zone.

27. The process of claim 2, further comprising:
(d) extracting hydrogen peroxide from said liquid phase reaction medium at a location downstream from said elongated reaction zone so as to form a liquid product having a greater concentration of hydrogen peroxide in comparison to the concentration of hydrogen peroxide in said liquid phase reaction medium emerging from said elongated reaction zone.

28. The process of claim 27, further comprising:
(e) after extracting hydrogen peroxide from said liquid phase reaction medium, recycling said liquid phase reaction medium to said reaction zone.

29. The process of claim 2, wherein said organic compound is substantially completely miscible with water.

30. The process of claim 29, wherein said organic compound is selected from the group consisting of oxygenated organic compounds having from one to four carbon atoms.

31. The process of claim 29, wherein said organic compound is selected from the group consisting of alcohols and ketones.

32. The process of claim 29, wherein said organic compound is selected from the group consisting of methanol, ethanol, propanol, isopropanol, methyl ethyl ketone, butanol, isobutanol and tertiary butanol.

33. The process of claim 2, wherein said organic compound is essentially immiscible with water.

34. The process of claim 33, further comprising:
(d) contacting said liquid phase reaction medium containing hydrogen peroxide with an aqueous medium in a solvent extraction zone and therein extracting hydrogen peroxide from said liquid phase reaction medium into said aqueous medium.

35. The process of claim 33, wherein said organic compound is selected from the group consisting of oxygenated organic compounds having from four to eight carbon atoms.

36. The process of claim 33, wherein said organic compound is selected from the group consisting of n-amyl alcohol, pentanol-2, 2 methyl butanol-2, 2, methyl butanol-3, 2 methyl butanol-4, active amyl alcohol, benzyl alcohol, n-butanol, sec-butanol, cyclohexanol, cyclopentanol, dimethyl carbonate, diethyl carbonate, n-hexyl alcohol, n-actyl alcohol and halgenated derivatives of n-actyl alcohol.

37. The process of claim 33, wherein said liquid phase reaction medium further comprises an aqueous solution, and the process further comprises:
(d) separating said liquid phase reaction medium into a substantially organic phase comprising said organic compound and a substantially aqueous phase including hydrogen peroxide.

38. The process of claim 2, wherein said liquid phase reaction medium is maintained at a flow rate of at least about four feet per second within said elongated reaction zone.

39. The process of claim 2, wherein at least a portion of said elongated reaction zone is maintained at a temperature of between about 0° C. and about 60° C.

40. The process of claim 2, wherein said plurality of tubes includes at least two banks of tubes separated by mixing zones to facilitate mixing of the liquid phase reaction medium between the banks of tubes.

41. The process of claim 2, wherein each tube is cylindrical and has an outside diameter in the range from 5 mm to 20 mm.

* * * * *